Oct. 4, 1960  A. L. LEE ET AL  2,954,864
FLIGHT CONVEYOR
Filed Oct. 21, 1957
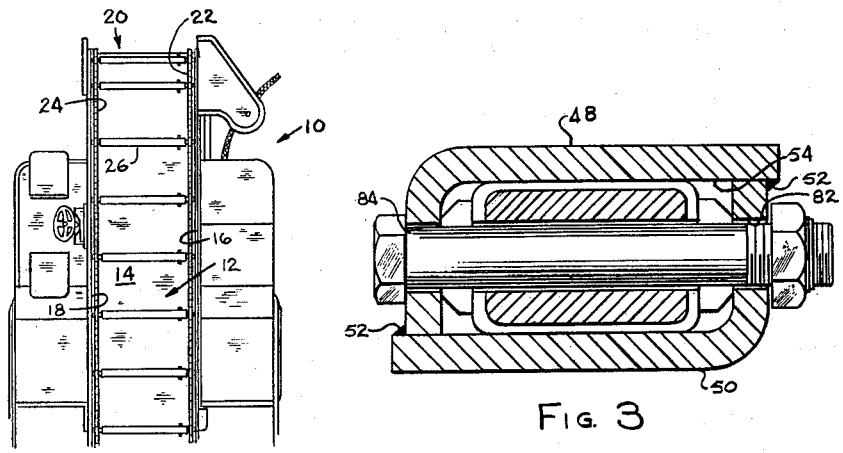
FIG. 1
FIG. 3
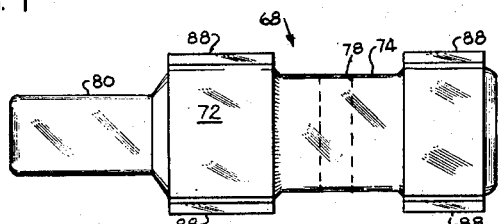
FIG. 4
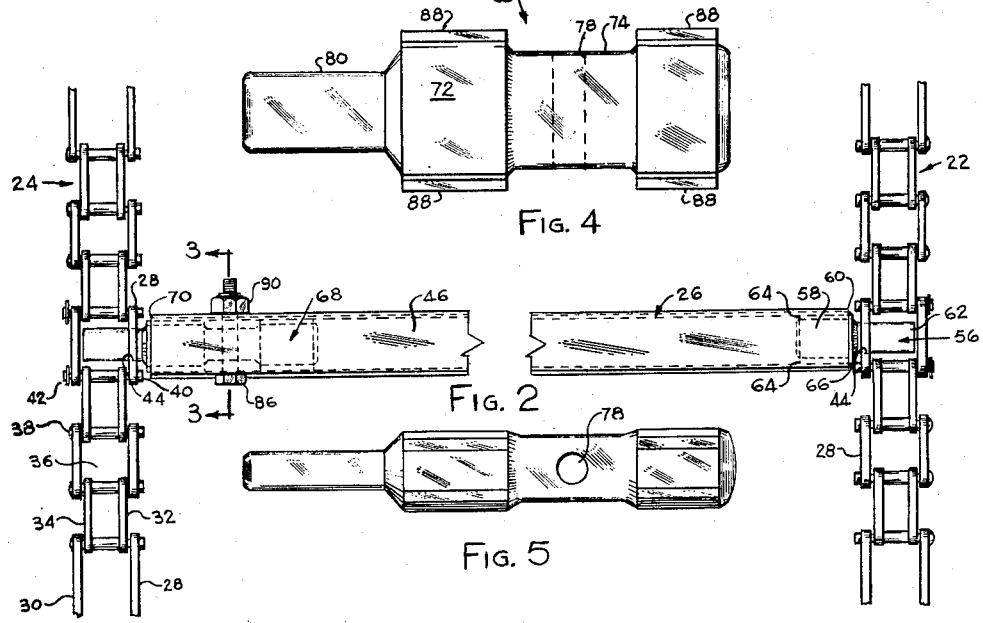
FIG. 2
FIG. 5
INVENTORS
ARTHUR L. LEE
ARTHUR B. COVAL
BY
THEIR ATTORNEY United States Patent Office 2,954,864
Patented Oct. 4, 1960

2,954,864

FLIGHT CONVEYOR

Arthur L. Lee and Arthur B. Coval, Columbus, Ohio, assignors to Consolidation Coal Company, Pittsburgh, Pa., a corporation of Pennsylvania Filed Oct. 21, 1957, Ser. No. 691,237

4 Claims. (Cl. 198—175)

This invention relates to flight conveyors and more particularly to flight conveyors which are adapted for use in mine haulage vehicles.

The conventional mine haulage vehicle has a flight conveyor extending along the bottom of the material haulage compartment. This flight conveyor assists in spreading the material throughout the material haulage compartment during the loading operation and serves as a means to discharge the material during the unloading operation.

The conventional transverse element of the flight conveyor employed in a mine haulage vehicle is formed from a unitary rectangular metal bar. The end portions of the flight element are usually of reduced rectangular cross section. These end portions are arranged to extend into rectangular receiving apertures in certain links of the flight conveyor chains. These transverse flight elements, although of rugged construction, are subject to damage from hard foreign substances in the material being transported by the mine haulage vehicle and are also subject to wear because of their frictional engagement with the material haulage compartment bottom wall.

To replace a damaged or worn transverse flight element it is necessary to dismantle the entire conveying mechanism. The dismantling operation is both laborious and time consuming since it requires the disconnecting or breaking of at least one of the endless conveyor chains. To disconnect a conveyor chain the conveyor takeup mechanism must be adjusted to eliminate chain tension. Next, one of the connecting pins must be removed from adjacent links. To remove the connecting pin the chain, i.e. the entire conveyor, is moved longitudinally along the bottom of the material haulage compartment until the pin is exactly aligned with a special aperture in the side wall of the haulage vehicle. The adjustment of the conveyor mechanism prior to the removal of the connecting pin is necessary because of the peculiar arrangement or construction of the conveyor flights and the material haulage compartment. The chains are positioned along the bottom wall and adjacent the side walls of the material haulage compartment. After the pin is properly aligned with the aperture in the side wall the chain is disconnected and the damaged or worn transverse flight element may then be removed and replaced. A similar time consuming procedure must then be followed to reassemble the transverse flight conveyor. This entire operation is long and laborious and removes the mine haulage vehicle from productive operation for a substantial length of time.

We have discovered with our improved transverse conveyor flight element that the flight elements may be removed in a short period of time without either breaking the conveyor chain or adjusting the takeup mechanism. In fact, it is no longer necessary to position the chain at a given point along the vehicle side wall so that the pin member may be removed from the chain.

Accordingly, the principal object of our invention is to provide a conveying mechanism for a mine haulage vehicle wherein the transverse conveyor flight elements may be removed and replaced without dismantling the endless chain portion of the conveyor.

Another object of our invention is to provide a conveyor flight element that has an end portion telescopically positioned within the conveyor flight body portion.

A further object of our invention is to provide a conveyor flight element having an end projecting portion that is movable relative to the flight element body portion and a means to maintain the projecting end portions in fixed relation relative to the body portion.

These and other objects and advantages of this invention will be more completely disclosed and described in the following specification, the accompanying drawings and the appended claims.

In the accompanying drawings to be taken as part of this specification we have fully and clearly illustrated our invention, in which drawings:

Figure 1 is a fragmentary plan view of the discharge end portion of a mine haulage vehicle.

Figure 2 is an enlarged plan view of a portion of the conveyor mechanism positioned in the material haulage portion of the shuttle car.

Figure 3 is a further enlarged view in section taken along the line 3—3 of Figure 2.

Figure 4 is a further enlarged top plan view of the telescopic end portion of the transverse conveyor flight element.

Figure 5 is a view in side elevation of the telescopic end portion illustrated in Figure 4.

Referring to the drawings and in particular to Figure 1 there is illustrated a mine haulage vehicle generally designated by the numeral 10 which has a material haulage compartment extending lengthwise thereof. The recessed material haulage compartment 12 has a bottom wall 14 and a pair of vertical side walls 16 and 18. The general construction of a mine haulage vehicle is illustrated in detail in Patent No. 2,754,012 issued to Arthur L. Lee and entitled "Mine Haulage Vehicle." Positioned along the bottom wall 14 of the material haulage compartment 12 is an endless conveyor generally designated by the numeral 20. The conveyor is of the link chain type and includes a first endless chain 22 and a second endless chain 24. The chains 22 and 24 are driven by sprocket members adjacent the discharge end (not shown) and a power means supplied by the prime mover of the vehicle 10. The chains 22 and 24 ride along the bottom wall 14 of the recessed material haulage compartment and are adjacent the side walls 16 and 18. Transverse conveyor flight elements 26 are connected to both chains 22 and 24 and extend transversely of the material haulage compartment 12.

Referring to Figure 2 there is illustrated in detail the connection between the transverse conveyor flight element 26 and the chains 22 and 24. The chains 22 and 24 have a pair of parallel outside bars 28 and 30 and a pair of inside bars 32 and 34 arranged in alternating relationship with each other. A spacer type knuckle 36 is positioned between the inside bars 32 and 34 to maintain these bars in spaced relation to each other. Rivet members 38 extend through mating apertures in the outside and inside bars and the passageways in the spacing knuckle members 36 and secure the link members to each other. At predetermined distances along the chains 22 and 24 coupling pins 40 are substituted for the rivet members 38. The coupling pins 40 are maintained in position by means of a conventional cotter key 42. By removing the cotter key 42 and tapping out the coupling pin 40 the link chains 22 and 24 may be broken for assembly and disassembly.

Certain of the outside bar members 28 have rectangular apertures 44 therethrough which are adapted to receive portions of the transverse flight elements 26.

The transverse flight element 26 has a body portion 46 which is constructed of a pair of angle members 48 and 50 that are secured in lengthwise relation with each other by means of welds 52 to form a rectangular body portion 46 with a longitudinal passageway 54 therethrough.

An end attachment member 56 which has a portion 58 in rectangular cross section is positioned within the body portion 46 adjacent one end 60. The end attachment member has a projecting portion 62 that is of reduced rectangular cross section relative to the portion 58 and is adapted to be positioned in the rectangular aperture 44 in the chain outside bar 28. A pair of shim bars 64 are secured to the side walls of the rectangular portion 58 to maintain the side walls of the projecting portion 62 in parallel relation with the side walls of body portion 46. The end attachment member 56 is rigidly secured to the transverse flight element end portion 60 by means of welds 66 or the like.

A movable end attachment member generally designated by the numeral 68 is positioned in the passageway 54 of the conveyor flight element body portion 46 adjacent the other end portion 70. The movable end attachment member 68 is rectangular in construction and has a securing portion 72 with a pair of side walls 74 and 76. The side walls are indented intermediate their ends and have a lateral passageway 78 therethrough. The movable end attachment member 68 has a rectangular projecting end portion 80 on one end which is also adapted to be positioned in the chain outside bar rectangular apertures 44.

The movable end attachment member 68 is adapted to be positioned in the passageway 54 with its longitudinal passageway aligned with apertures 82 and 84 which are located in the side walls of the conveyor flight body portion 46. When the passageway 78 is so aligned with the apertures 82 and 84 the movable end attachment member is so constructed that the end projection 80 extends through the rectangular aperture 44 in the chain outside bar 28. A bolt 86 extends through the aligned conveyor flight apertures 82 and 84 and the passageway 78 to maintain the movable end projection member 68 in a fixed position relative to the transverse conveyor flight element body portion 46. A plurality of shim members 88 are secured to the side walls 74 and 76 of the end attachment securing portion 72 to maintain the side walls of the end attachment member projection 80 in parallel relation with the side walls of the conveyor flight body portion 46.

To remove the transverse conveyor flight element 26 from the conveying mechanism 20 a nut 90 is removed from the bolt 86 and the bolt 86 is withdrawn from the apertures 82 and 84 and the passageway 78. The movable end projection member 68 is then free to move longitudinally inwardly in the body portion passageway 54 so that the end projection 80 can be withdrawn from the aperture 44 in the chain link outside bar 28. After the projection 80 is withdrawn from the aperture 44 the conveyor flight element 26 may be easily removed from both chains 22 and 24 by lifting the end portion 70 of flight element 26 upwardly away from the haulage compartment bottom wall 14 until the end portion 70 is above the chain 24. The flight element 26 is then moved laterally toward the haulage compartment side wall 18 until the projecting end portion 62 of end attachment 56 is removed from aperture 44 in chain 22. The removal of the flight element 26 is accomplished without breaking either of the chains 22 or 24 as heretofore has been the practice.

To install a transverse conveyor flight element 26 the movable end attachment member 68 is positioned within the passageway 54. The fixed end attachment 56 is then inserted in the appropriate aperture 44 in the link outside bar in chain 22. The conveyor flight element 26 is then positioned on the haulage compartment bottom wall 14 with the movable end projection 80 aligned with the aperture 44 in the outside bar 28 of chain 24. The movable end attachment member 68 is then moved outwardly relative to the transverse conveyor element body portion 48 in passageway 54 so that the movable end projection 80 is inserted in aperture 44 of chain link outside bar 28. The movable end attachment member 68 is moved outwardly relative to the conveyor element body portion 48 until the movable end attachment member passageway 78 is aligned with the apertures 82 and 84. Simultaneously the end projection 80 will extend through the rectangular aperture 44 in the outside link 28 of chain 24 to thereby fixedly position the conveyor flight element 26 relative to the chains 22 and 24. To maintain the movable end attachment member 68 in a proper fixed position the bolt 86 is then extended through the passageway 78 and apertures 82 and 84 and nut 90 is threadedly secured thereon.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A conveying mechanism for a mine haulage vehicle having a longitudinal recessed material haulage compartment with a bottom wall and a pair of spaced side walls, the combination comprising a pair of endless chain members positioned on said bottom wall in spaced parallel relation to each other and adjacent said respective side walls, said chain members having links with alternating spaced parallel outside bars and spaced parallel inside bars, certain of said outside bars having rectangular apertures therethrough, a plurality of conveyor flight elements positioned transversely along the bottom of said material haulage compartment, said conveyor flight elements arranged to be positioned between and operatively secured to said chains, said conveyor flight elements having a body portion of substantially rectangular cross section, said body portion having a longitudinal passageway therein and a pair of aligned transverse apertures therethrough, a pair of projections extending from the ends of said body portion, said projections being substantially rectangular in cross section and arranged to extend through said outside bar rectangular apertures, one of said projections telescopically positioned within said body portion passageway and movable longitudinally relative thereto so that said conveyor flight element end projections may be removed from said outside bar rectangular apertures, said movable projection member having a transverse passageway therethrough, bolt means adapted to extend through said projection passageway and said body portion apertures to maintain said last named projection in fixed relation to said body portion and operatively securing said end projections in said chain outside bar rectangular apertures, said movable projection member having a pair of vertical side walls with said transverse passageway extending therethrough, and shim members secured to both of said side walls on opposite sides of said passageway, said shim members arranged to maintain the longitudinal axis of said movable end projection substantially parallel to the longitudinal axis of said conveyor flight element body portion.

2. A conveying mechanism for a mine haulage vehicle having a longitudinal recessed material haulage compartment with a bottom wall and a pair of spaced side walls, the combination comprising a pair of endless chain members positioned on said bottom wall in spaced parallel relation to each other and adjacent said side walls, said chain members having link members, certain of said link members having polygonal apertures therethrough, a plurality of conveyor flight elements removably positioned transversely along the bottom of said material haulage compartment, said conveyor flight elements arranged to be positioned between and operatively secured to said chains, said conveyor flight elements having a body portion of substantially polygonal cross section, said body portion having a longitudinal passageway therein and a pair of aligned transverse apertures therethrough, a pair of end projections extending from the ends of said body portion, said end projections being substantially polygonal in cross section to conform with said link member polygonal apertures, said end projections arranged to extend through certain of said link member polygonal apertures, at least one of said end projections including a portion conforming with that of said body portion passageway and telescopically positioned within said body portion passageway, said one end projection being displaceable longitudinally relative to said body portion within said body portion passageway so that said conveyor flight element end projection may be removed from said link member polygonal apertures, said one end projection having a transverse passageway therethrough, locking means removably extending through said projection passageway and said body portion apertures to maintain said one end projection in fixed relation to said body portion and operatively securing said end projections in said link member polygonal apertures, and shimming means on opposite sides of said passageway, said shimming means maintaining the longitudinal axis of said one end projection substantially parallel to the longitudinal axis of said conveyor flight element body portion.

3. A conveying mechanism as set forth in claim 2 in which said body portion has a length substantially equal to the space between said chains, and said shimming means comprises separate shim members secured on opposite sides of said one end projection and within the longitudinal passageway of said body portion.

4. In a conveying means including an elongated compartment having a bottom wall and spaced parallel side walls, and endless link-chains having runs disposed in the compartment and restrained against outward movement by said side walls, and in which certain opposed links of the chains include aligned polygonal transverse apertures; the improvement comprising a replaceable flight element for removable positioning transversely of the compartment between the chains, said flight element having a body portion of substantially polygonal cross section, said body portion having a longitudinal passageway therein and a pair of aligned transverse apertures therethrough, a pair of end projections extending from the ends of said body portion, said end projections being substantially polygonal in cross section for conforming with said polygonal link apertures and arranged to extend through certain link apertures, at least one of said end projections including a portion conforming with that of said body portion passageway and telescopically positioned with said passageway and displaceable relative thereto for permitting said one end projection to be removed from said link apertures, said one end projection having a transverse passageway therethrough, locking means removably extending through said one end projection passageway and said body portion apertures to maintain said one end projection fixed relative to said body portion and in the link apertures, and shimming means on opposite sides of said passageway for maintaining said one end projection substantially parallel to the longitudinal axis of said flight element body portion.

References Cited in the file of this patent

UNITED STATES PATENTS

| 633,202 | Lamm | Sept. 19, 1899 |
| 848,236 | Ginaca | Mar. 26, 1907 |
| 2,575,610 | Ball | Nov. 20, 1951 |
| 2,631,716 | Kottmann | Mar. 17, 1953 |
| 2,736,422 | McCallum | Feb. 28, 1956 |
| 2,817,446 | Hodous | Dec. 24, 1957 |

FOREIGN PATENTS

| 101,740 | Switzerland | Oct. 1, 1923 |